(12) United States Patent
Ghasemi et al.

(10) Patent No.: US 8,050,918 B2
(45) Date of Patent: Nov. 1, 2011

(54) QUALITY EVALUATION TOOL FOR DYNAMIC VOICE PORTALS

(75) Inventors: Reza Ghasemi, Pompano Beach, FL (US); Walter Haenel, Holzgerlingen (DE)

(73) Assignee: Nuance Communications, Inc., Burlington, MA (US)

( * ) Notice: Subject to any disclaimer, the term of this patent is extended or adjusted under 35 U.S.C. 154(b) by 1436 days.

(21) Appl. No.: 10/733,995

(22) Filed: Dec. 11, 2003

(65) Prior Publication Data

US 2005/0131676 A1 Jun. 16, 2005

(51) Int. Cl.
*G10L 15/06* (2006.01)
*H04M 1/64* (2006.01)

(52) U.S. Cl. ........ 704/244; 704/239; 704/243; 704/231; 379/88.01

(58) Field of Classification Search .................. 704/231, 704/239, 244, 243; 379/88.01
See application file for complete search history.

(56) References Cited

U.S. PATENT DOCUMENTS

| | | | |
|---|---|---|---|
| 5,442,376 A | 8/1995 | Tannenbaum et al. | |
| 5,559,925 A * | 9/1996 | Austin | 704/231 |
| 5,715,369 A | 2/1998 | Spoltman et al. | |
| 5,748,191 A | 5/1998 | Rozak et al. | |
| 5,774,628 A | 6/1998 | Hemphill | |
| 5,832,430 A * | 11/1998 | Lleida et al. | 704/256 |
| 5,991,712 A | 11/1999 | Martin | |
| 6,263,308 B1 * | 7/2001 | Heckerman et al. | 704/231 |
| 6,269,335 B1 * | 7/2001 | Ittycheriah et al. | 704/270 |
| 6,275,797 B1 * | 8/2001 | Randic | 704/233 |
| 6,377,662 B1 * | 4/2002 | Hunt et al. | 379/88.01 |
| 6,421,672 B1 | 7/2002 | McAllister et al. | |
| 6,505,155 B1 * | 1/2003 | Vanbuskirk et al. | 704/246 |
| 6,523,004 B1 | 2/2003 | Vanbuskirk et al. | |
| 6,570,964 B1 | 5/2003 | Murveit et al. | |
| 6,622,121 B1 * | 9/2003 | Crepy et al. | 704/243 |
| 6,816,837 B1 | 11/2004 | Davis | |
| 6,826,306 B1 * | 11/2004 | Lewis et al. | 382/187 |
| 6,839,667 B2 * | 1/2005 | Reich | 704/240 |
| 7,035,799 B1 * | 4/2006 | Hauenstein | 704/246 |
| 7,103,542 B2 * | 9/2006 | Doyle | 704/231 |
| 7,117,153 B2 * | 10/2006 | Mahajan et al. | 704/236 |
| 7,139,706 B2 * | 11/2006 | Yuschik | 704/243 |

(Continued)

OTHER PUBLICATIONS

Trabelsi, Z. et al., "Multimodal Integration of Voice and Ink for Pervasive Computing," *Proc. IEEE 4th Int'l Symposium on Multimedia Software Engineering* (MSE '02) (2002).

*Primary Examiner* — Richemond Dorvil
*Assistant Examiner* — Douglas Godbold
(74) *Attorney, Agent, or Firm* — Wolf, Greenfield & Sacks, P.C.

(57) ABSTRACT

A method and system for evaluating the quality of voice input recognition by a voice portal is provided. An analysis interface extracts a set of current grammars from the voice portal. A test pattern generator generates a test input for each current grammar. The test input includes a test pattern and a set of active grammars corresponding to each current grammar. The system further includes a text-to-speech engine for entering each test pattern into the voice server. A results collector analyzes each test pattern entered into the voice server with the speech recognition engine against the set of active grammars corresponding to the current grammar for said test pattern. A results analyzer derives a set of statistics of a quality of recognition of each current grammar.

17 Claims, 3 Drawing Sheets

U.S. PATENT DOCUMENTS

| | | | |
|---|---|---|---|
| 7,165,031 B2 * | 1/2007 | Rees | 704/252 |
| 7,509,259 B2 | 3/2009 | Song | |
| 2002/0049593 A1 * | 4/2002 | Shao | 704/251 |
| 2002/0082833 A1 * | 6/2002 | Marasek et al. | 704/251 |
| 2002/0120452 A1 | 8/2002 | Davis et al. | |
| 2002/0173955 A1 * | 11/2002 | Reich | 704/231 |
| 2002/0188451 A1 * | 12/2002 | Guerra et al. | 704/270 |
| 2003/0004722 A1 * | 1/2003 | Butzberger et al. | 704/257 |
| 2003/0163319 A1 | 8/2003 | Kemble et al. | |
| 2003/0191639 A1 * | 10/2003 | Mazza | 704/231 |
| 2004/0088285 A1 | 5/2004 | Martin et al. | |
| 2004/0193403 A1 | 9/2004 | Creamer et al. | |
| 2005/0036589 A1 * | 2/2005 | Bossemeyer, Jr. | 379/88.01 |
| 2005/0086055 A1 * | 4/2005 | Sakai et al. | 704/231 |
| 2005/0165607 A1 | 7/2005 | Di Fabrizio et al. | |
| 2005/0226396 A1 | 10/2005 | Davis et al. | |
| 2005/0238145 A1 | 10/2005 | Knott et al. | |
| 2006/0004826 A1 | 1/2006 | Zartler et al. | |
| 2006/0013487 A1 | 1/2006 | Longe et al. | |
| 2006/0025996 A1 | 2/2006 | Ju et al. | |
| 2006/0106614 A1 | 5/2006 | Mowatt et al. | |
| 2006/0149824 A1 | 7/2006 | Park et al. | |

* cited by examiner

QUALITY EVALUATION TOOL FOR DYNAMIC VOICE PORTALS

BACKGROUND OF THE INVENTION

1. Statement of the Technical Field

The present invention relates to the field of computer software and speech recognition and more particularly to user-navigated dynamic voice portals that use speech recognition technology.

2. Description of The Related Art

Contrary to visual applications, voice-based applications have the problem that for input recognition no strict pattern matching can be used. The nature of speech recognition makes it very difficult to distinguish between terms having similar pronunciations. Therefore, during the design of speech applications, care should be taken to provide input choices which are pronounced as differently as possible, so as to avoid the problem of recognizing the wrong choice.

The problem of recognizing the wrong input choice in a speech recognition application occurs with voice portals, which are generally built by various parties that may not be aware of the terms used in the various applications disposed within the voice portal. Often, a voice portal will have, in addition to the current grammars (or commands) for the actual choice to be made, additional active grammars, such as certain "universal" grammars that allow a user to navigate through the portal, e.g. a command such as "go back." Thus, at any given moment, a combined set of grammars are active, and the voice recognition engine has to search in the set of combined active grammars for a match.

A problem arises if the various grammars used across the various applications on the portal are designed by different parties, as is the case for voice portals built on a general portal architecture, such as the IBM WebSphere™ Portal Server. General portal architecture allows for new applications to be added dynamically by an administrator. The new added choices created by each new application modify the available choices in a selection menu, and thereby affect the quality of recognition. Generally, the administrators are not voice technology specialists, and may further have to operate a voice portal in multiple languages. Because of this, there is always a risk that a new voice application may drastically reduce the quality of the portal.

FIG. 1 depicts an example of a sample content and organization of a voice portal. The user is generally presented with a tree 10, into which, after logging into the portal, the user starts at a home directory 11. The tree then divides into new sub-directories 12 and 14, for "Business" and "Entertainment", respectively. At home directory 11, the user would be presented with two choices, for "Business" or "Entertainment," which would be the current grammars for the choice that the portal would need to recognize. In addition to those current grammars, there may be additional active grammars, such as "go back" or "quit." As the user navigates deeper into the menu 10, the current grammars may change from one menu selection step to another. After the "Places" menu selection step 60, the user would proceed to the "Pages" step 65, and would be presented with a new set of menu options 16, 17, 81, and 19, labeled "Information," Notes, "Directory," and "Sports," respectively. The new menu options would be added to the set of active grammars.

Below these menu options are the various portlets or voice applications in the applications phase 70 at the bottom of the menu. Applications 20, 22, 24 each branch off from menu item 16, while applications 40, 42, and 44 each branch off from menu item 18. The two sets of voice applications may have been written and arranged by different parties not knowing which terms the other party used for the title of each application. Within each branch of applications additional grammars would be added to the active set which the speech recognition engine of the portal must recognize.

In menu 10, it can be seen that application 34 is titled "Directory," which is the same as menu option 18. If the grammar for selecting menu option 18 is active within the selection choice following menu option 17, then the system would have trouble distinguishing between identically pronounced terms. Similarly, if a universal grammar such as "store settings" was also active, this would present recognition problems if the user were to navigate through menu item 18, which has the application named "Stores."

Currently, the only way of testing a portal's recognition quality after setting up the portal or installing a new voice application (or portlet) is to call into the system and check manually, or by user testing with a human user, how well the system works. This can be time-consuming and expensive. It would be desirable therefore, to provide a quality evaluation tool that assesses the ability of a voice portal to recognize different terms in the various applications attached to the portal, by analyzing and measuring the similarity of the terms.

SUMMARY OF THE INVENTION

The present invention addresses the deficiencies of the art with respect to evaluating the quality of voice input recognition by a voice portal and provides a novel and non-obvious method, system and apparatus for evaluating the quality of voice recognition by dynamic voice portals.

In a method of evaluating the quality of voice input recognition by a voice portal, a current grammar is extracted from the voice portal. A test input is generated for the current grammar. In this regard, the test input includes a test pattern and a set of active grammars for the current grammar. The test input can be entered into the voice server and the test pattern can be analyzed against the set of active grammars with a speech recognition engine in the voice server. Consequently, a measure of the quality of recognition for the current grammar can be derived.

Systems consistent with the present invention include a system for evaluating the quality of voice input recognition by a voice portal. An analysis interface extracts a set of current grammars from the voice portal. A test pattern generator generates a test input for each current grammar. The test input includes a test pattern and a set of active grammars corresponding to each current grammar. The system further includes a text-to-speech engine for entering each test pattern into the voice portal. A results collector analyzes each test pattern entered into the voice portal with the speech recognition engine against the set of active grammars corresponding to the current grammar for said test pattern. A results analyzer derives a set of statistics of a quality of recognition of each current grammar.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method and system for evaluating the quality of voice input recognition by a voice portal. The invention works by collecting a set of grammars for one or more voice applications disposed in a voice portal and testing the ability of the voice portal to recognize a particular grammar from among the set of other grammars that may be active with the particular grammar being tested. A measure of quality of recognition can be derived for each grammar, thereby enabling the voice portal to be reconfigured to allow for better voice input recognition.

Figure 2:
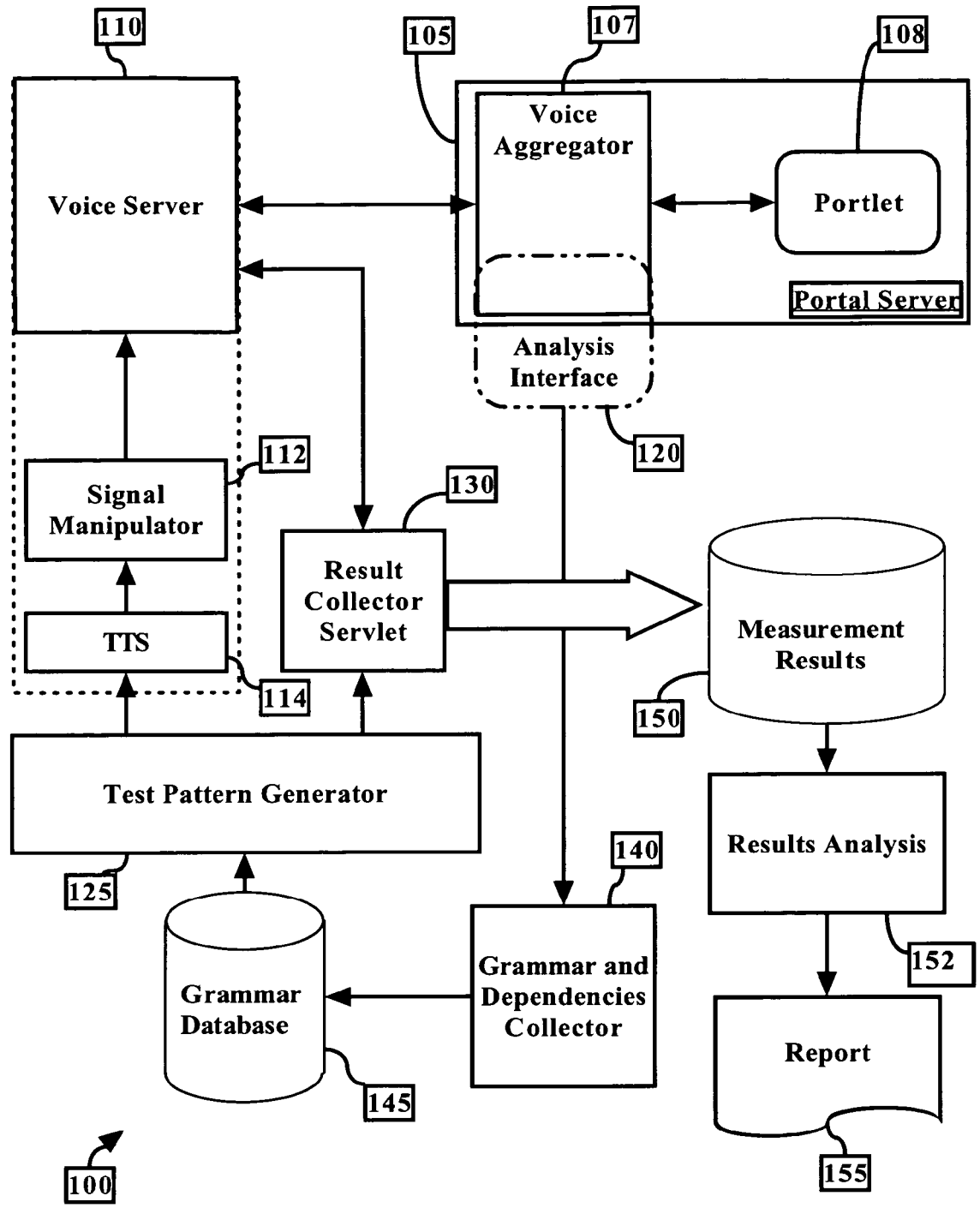
FIG. 2 illustrates a voice portal with a system arranged in accordance with the principles of the present invention for evaluating the quality of voice input recognition by the voice portal.

FIG. 2 illustrates a voice portal with a system arranged in accordance with the principles of the present invention for evaluating the quality of voice input recognition by the voice portal. The overall integrated system 100 can include a voice portal having a portal server 105 and a voice server 110. The portal server includes a voice aggregator 107 and one or more voice applications or portlets 108. The voice server can also include a text-to-speech (TTS) engine 114 and a signal manipulator 112. To this overall system 100, the present invention couples an analysis interface 120 to the portal server 105, a test pattern generator 125, a result collector servlet 130, a grammar and dependencies collector 140 and grammar database 145, a measurements results database 150, and a results analysis unit 152 which produces one or more reports 155.

The portal server 105 can be voice-enabled through coupling to a voice server 110. The voice server 110 is the unit with which an outside caller directly communicates, and can be linked to a telephone network or some other communications network. The voice aggregator 107 is the software that manages the various voice applications 108 running on the portal server 105. When a user communicates with the voice portal, the voice aggregator presents the user with a menu, such as the menu in FIG. 1, wherein the user can select voice applications and content from a variety of selections, and can also navigate through the menu and the various voice applications 108. Each command that a user enters into the voice portal is a grammar which the voice server 110 must recognize to send an appropriate command to the portal server 105.

The analysis interface 120 exposes external entities to the logic of the voice aggregator 107 and allows the grammar and dependencies collector 140 to collect the various grammars enabled in the voice portal. The grammar database 145 and measurements results database 150 can be one or more data storage media or devices. The signal manipulator 112 can be any signal processing component that emulates the influence of different telephone or communications network qualities, such as line length, crosstalk, or noise, that is applied to the output of the TTS generator 114. The TTS 114 and manipulator 112 can be separated from the voice server 110 or can be integral to the voice server 110.

As used herein, a "current grammar" shall mean any grammar that is on the system of the voice portal, and can be any one of the grammars that corresponds to the various menu options for: (i) navigating through the voice portal, and (ii) selecting one of the portlets 108 on the portal server 105. The core idea of the invention is to check all current grammars in a voice portal with an automatic mechanism, so as to assess the capability and quality of voice recognition of the voice portal.

Figure 3:
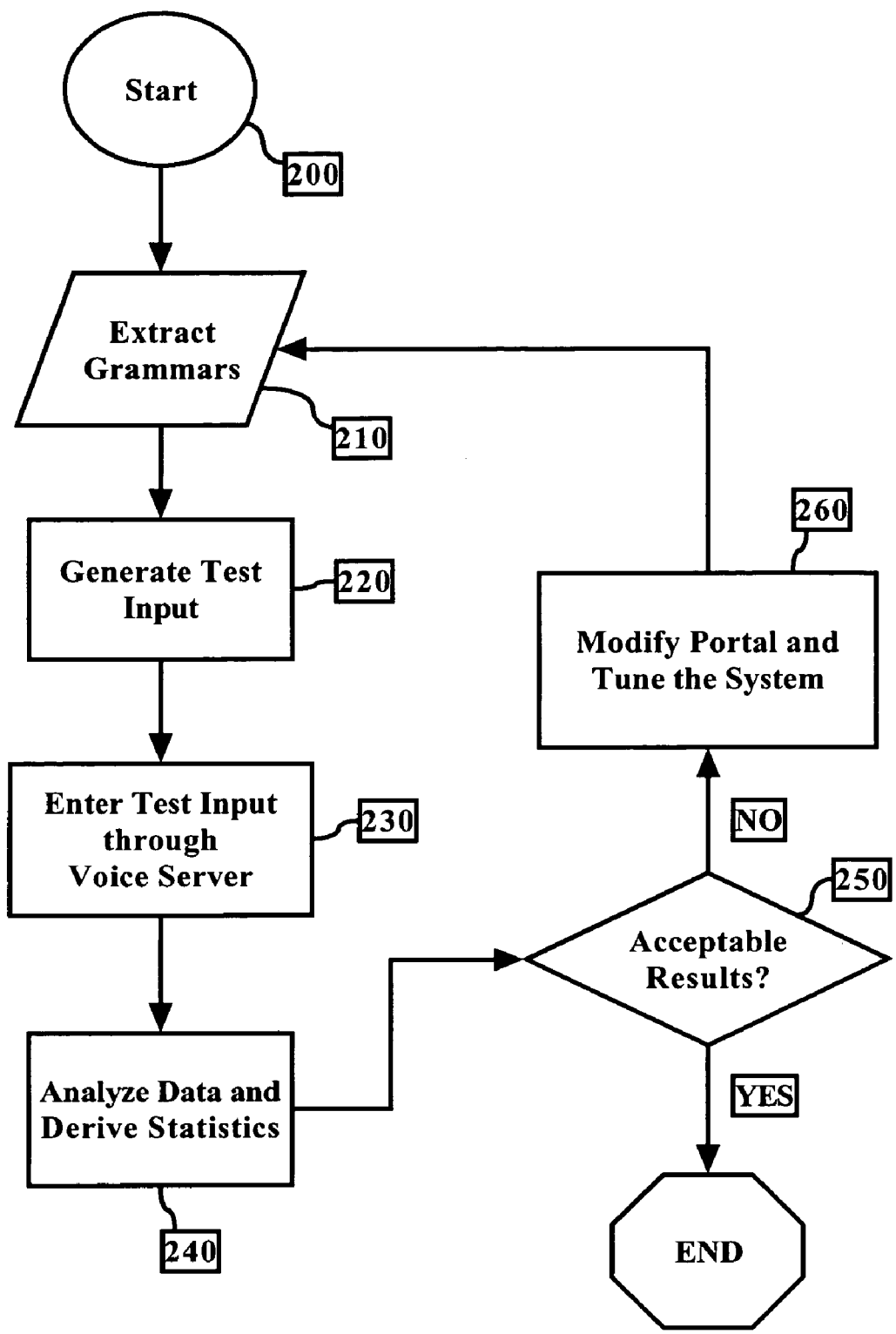
FIG. 3 is a flowchart showing the process of evaluating the quality of voice input recognition by a voice portal.

FIG. 3 is a flowchart showing the process of evaluating the quality of voice input recognition by a voice portal. In this process, the present invention first provides for an analysis interface 120 software to be coupled to the voice portal and with the portal server 105. The analysis interface 120 communicates with the voice aggregator 107 to extract and retrieve any and all current grammars, at step 210. Since portal servers like portal server 105 are most likely implemented as a web application, the grammar and dependencies collector 140 could send one or multiple HTTP requests through analysis interface 120 to collect the current grammars, as well as the dependencies between the grammars. A database 145 can be used to store the data.

The test pattern generator 125 software can select a grammar from the set of current grammars stored in database 145, as well as the other grammars dependent on the selected grammar. A dependent grammar is any other grammar that may be executed by a user at any given aggregation step when navigating through the menu of the voice portal. Taking the menu in FIG. 1 as an example, if the user had navigated to menu item 17 for "Notes", the voice aggregator 1.07 could present a set of "active" grammars to a user at that stage, being the grammars for each of the portlets 30, 32, and 34, for "Projects", "Meetings" and "Directory", respectively, the grammars for the other menu options 16, 18, and 19, for "Information", "Directory" and "Sports", respectively, and the navigational grammars, such as "go back" or "quit." Therefore, as used herein, for any given current grammar which may be selected by the test pattern generator 125, the set of "active" grammars are all other grammars that may be presented to the user, including the selected current grammar, at the stage in the voice portal where the user may enter a command corresponding to the selected current grammar.

For each selected current grammar, the test pattern generator 125 creates a "test input" for the grammar, at step 220. The test input can include both a test "pattern" and a set of active grammars corresponding to the current grammar for which the test input and test pattern is generated. The test pattern can be the actual word or term for the current grammar, or may also include additional words, terms, or sounds. The test pattern can also be entire sentences or phrases. Thus, the test input can include one or more test patterns that incorporate the selected current grammar in some way.

The test pattern generator 125 thus generates a test input for each current grammar and also aggregates a set of active grammars corresponding to the current grammar for each test input. The test input can be a VXML document having the test patterns and set of active grammars incorporated therein.

The test input is then entered into the voice server at step 230. The test pattern itself is entered through the TTS engine 114 and signal processor 112 into the voice server 110. The signal processor 112 can manipulate the sound of the test pattern by emulating the effects of different user voices, different languages, varying communications network qualities, and other modifications of the sound signature of the test pattern. Both TTS engine 114 and signal manipulator 112 may be separate units outside of the voice portal, in which case the synthesized output of the two units could be connected to the voice server 110 through some communications network. Or, the TTS 114 and signal manipulator 112 may already be integrated within the voice server 110. The set of active grammars corresponding to the current grammar for which the test pattern is generated is entered into the voice server 110 through a separate channel, such as from the results collector servlet 130, and may be done through the VXML test document described hereinabove.

Once the test pattern is entered into the voice server 110, in step 240, a speech recognition engine in the voice server can be used to obtain an assessment of how well the voice portal recognized the test pattern. The quality of the recognition of the test and the current grammar being tested by the test input is therefore obtained. This quality of recognition can be monitored and collected by the results collector servlet 130 and stored in the measurements results database 150. The quality of recognition can include a set of statistics that are generally used to assess the quality. Two examples of such statistics are the confidence level and n-best results, which generally used by speech recognition engines. Thus, the set of statistics can include a confidence level and a set of n-best results for the test input for each grammar tested, and resulting the confidence level and set of n-best results for the test input can be compared with an expected value for each metric to assess the quality of recognition.

In step 250, the process determines whether the quality of recognition is acceptable. If the quality is not acceptable, system 100 can be used to adjust and modify the selected current grammar, re-execute the test phase by running through steps 210, 220, 230 and 240, and re-assess whether the quality of recognition is acceptable. If the results are found to be acceptable at step 250, the process terminates.

Figure 1:
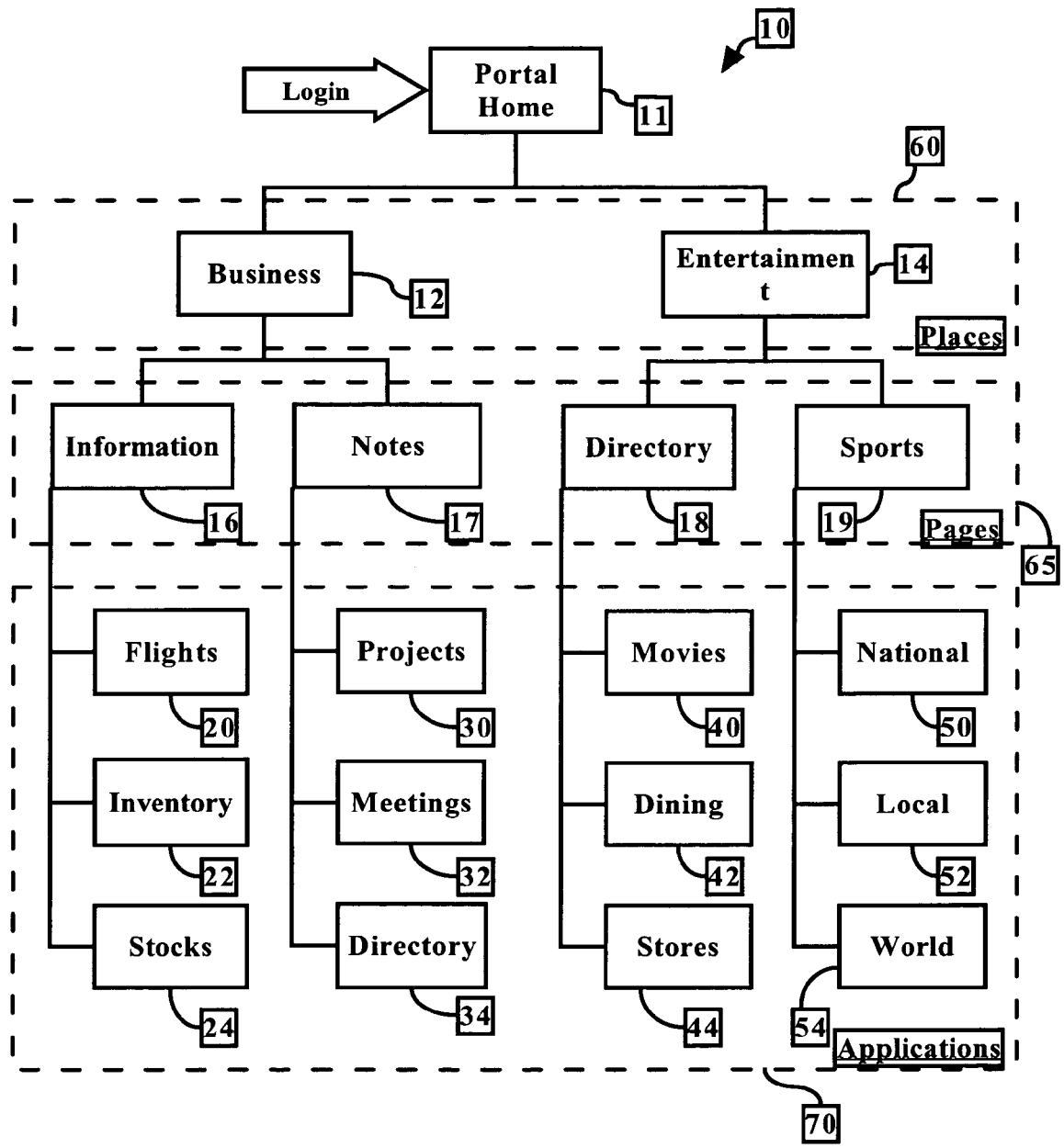
FIG. 1 is a block diagram illustrating an exemplary voice portal.

An example of the process of the method of the present invention can be illustrated using the voice portal menu 10 of FIG. 1. To test the quality of recognition of menu item 34 for "Directory", the test input having a test pattern including the word "Directory" can be generated. When the current grammar for menu option 34 for "Directory" was extracted, the set of active grammars would also have been created. If the system on the voice portal is configured to have the grammars activated at all times for all directories in the Places 60 and Pages 65 levels of menu 10, as well as certain grammars for navigational commands like "Go back" and "Quit", the set of active grammars for the current grammar for portlet 34 for "Directory" would be: {"Business", "Entertainment", "Information", "Directory", "Sports", "Projects", "Meetings", "Directory", "Go Back", "Quit"}. A test pattern of "Directory" could be recognized by the speech recognition engine in the voice portal by assigning confidence levels to each grammar in the set of active grammars. A theoretical example of such confidence levels are listed below in Table 1.

TABLE 1

| Grammar | Confidence Level |
| --- | --- |
| "Business" | 0.21 |
| "Entertainment" | 0.10 |
| "Information" | 0.32 |
| "Directory" | 0.98 |
| "Sports" | 0.28 |
| "Projects" | 0.26 |
| "Meetings" | 0.35 |
| "Directory" | 0.99 |
| "Go Back" | 0.08 |
| "Quit" | 0.12 |

Confidence levels of close to one are regarded as a near perfect match, whereas confidence levels of near zero are regarded as not a match. If more than one grammar in the set of active grammars were to produce very high confidence levels, each above a certain pre-determined threshold, then the quality of recognition could be assessed as poor, since the system could incorrectly recognize one grammar for another. This can be seen in the example set above, where the two grammars for "Directory" each produce confidence levels that are far above any other of the grammars. The voice portal would therefore recognize one of the two grammars having the high confidence level. But it would not be able to distinguish between the two. Thus, the system would show that the quality of recognition is low in that the voice portal would not be able to easily distinguish between two grammars for two different commands. Hence, the user's ability to navigate through the portal would be compromised.

The present invention therefore provides a method and system for evaluating the quality of voice input recognition by a voice portal. The present invention can execute a test of the voice portal very quickly, at relatively low cost, and with far greater ease than a human system administrator of a voice portal could otherwise do. The present invention could test all grammars in a system, even if the grammars were spoken in different languages, and even if a voice portal system administrator does not know the languages. Furthermore, because of the ability of TTS engines to render different voices (male, female, fast, slow . . . ), the present invention can utilize the TTS engine to test the voice portal with a much more robust input, than a human administrator can otherwise do. Also, because of a speech recognition engine's more fine-grained ability to characterize the similarity of two sounds, while a human system administrator could only determine whether a voice portal simply worked or did not work, the present invention can measure how much one sound differs from another to produce a more detailed assessment of the quality of recognition by a voice portal.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in different material form. Significantly, this invention can be embodied in other specific forms without departing from the spirit or essential attributes thereof, and accordingly, reference should be had to the following claims, rather than to the foregoing specification, as indicating the scope of the invention

We claim:

1. A method of evaluating grammars associated with a voice portal on a portal server, said method comprising:
   generating, for a current grammar of the voice portal representing a valid input for a first menu of the voice portal, a test input, the test input for the current grammar including a test pattern;
   providing the test input to the voice portal on the portal server using a voice server;
   receiving at least one measure of how distinguishable the current grammar is from other grammars of a set of active grammars that are active when the current grammar is active, the set of active grammars including the current grammar and at least one grammar from a second menu of the voice portal, the at least one measure based at least in part on analysis of the test pattern with respect to the set of active grammars, the at least one measure comprising at least one measure of how distinguishable the current grammar is from the at least one grammar from the second menu of the voice portal; and
   determining, based at least in part on the at least one measure, whether to modify the current grammar from the first menu to be distinguishable from the at least one grammar from the second menu.

2. The method of claim 1, wherein the at least one measure of how distinguishable the current grammar is from other grammars of the set of active grammars includes a confidence level and a set of n-best results for the test input, and wherein the method further comprises comparing the confidence level and set of n-best results for the test input with an expected value to assess the at least one measure of how distinguishable the current grammar is from other grammars of the set of active grammars.

3. The method of claim 1, further comprising modifying the current grammar to create a modified grammar if the at least one measure indicates that the current grammar is not sufficiently distinguishable from the other grammars of the set of active grammars.

4. The method of claim 3, further comprising:
   (i) generating a test input for the modified grammar, the test input including a test pattern for the modified grammar;
   (ii) providing the test input for the modified grammar to the voice portal on the portal server using the voice server;
   (iii) receiving at least one measure of how distinguishable the modified grammar is from other grammars of a set of active grammars that are active when the modified grammar is active, the modified grammar being one grammar of the set of active grammars that are active when the modified grammar is active; and
   (iv) modifying the modified grammar and repeating steps (i) through (iii) until the at least one measure of how distinguishable the modified grammar is from other grammars of the set of active grammars that are active when the modified grammar is active indicates that the modified grammar is sufficiently distinguishable from the other grammars of the set of active grammars that are active when the modified grammar is active.

5. The method of claim 1, further comprising modifying the test pattern to emulate one or more user voices prior to providing the test input to the voice portal.

6. The method of claim 1, further comprising modifying the test pattern to emulate the influence of one or more communications network qualities prior to providing the test input to the voice portal.

7. A tangible computer-readable storage device encoded with instructions which, when executed by a computer, cause the computer to perform a method of evaluating grammars associated with a voice portal, the method comprising:
   generating, for a current grammar of the voice portal representing a valid input for a first menu of the voice portal, a test input, the test input for the current grammar including a test pattern;
   providing the test input to the voice portal;
   receiving at least one measure of how distinguishable the current grammar is from other grammars of a set of active grammars that are active when the current grammar is active, the set of active grammars including the current grammar and at least one grammar from a second menu of the voice portal, the at least one measure based at least in part on analysis of the test pattern with respect to the set of active grammars, the at least one measure comprising at least one measure of how distinguishable the current grammar is from the at least one grammar from the second menu of the voice portal; and
   determining, based at least in part on the at least one measure, whether to modify the current grammar from the first menu to be distinguishable from the at least one grammar from the second menu.

8. The tangible computer-readable storage device of claim 7, wherein the at least one measure of how distinguishable the current grammar is from other grammars of the set of active grammars includes a confidence level and a set of n-best results for the test input, and wherein the method further comprises comparing the confidence level and set of n-best results for the test input with an expected value to assess the at least one measure of how distinguishable the current grammar is from other grammars of the set of active grammars.

9. The tangible computer-readable storage device of claim 7, wherein the method further comprises modifying the current grammar to create a modified grammar if the at least one measure indicates that the current grammar is not sufficiently distinguishable from the other grammars of the set of active grammars.

10. The tangible computer-readable storage device of claim 9, wherein the method further comprises:
    (i) generating a test input for the modified grammar, the test input including a test pattern for the modified grammar;
    (ii) providing the test input for the modified grammar to the voice portal;
    (iii) receiving at least one measure of how distinguishable the modified grammar is from other grammars of a set of active grammars that are active when the modified grammar is active, the modified grammar being one grammar of the set of active grammars that are active when the modified grammar is active; and
    (iv) modifying the modified grammar and repeating steps (i) through (iii) until the at least one measure of how distinguishable the modified grammar is from other grammars of the set of active grammars that are active when the modified grammar is active indicates that the modified grammar is sufficiently distinguishable from the other grammars of the set of active grammars that are active when the modified grammar is active.

11. The tangible computer-readable storage device of claim 7, wherein the method further comprises modifying the test pattern to emulate one or more user voices prior to providing the test input to the voice portal.

12. The tangible computer-readable storage device of claim 7, wherein the method further comprises modifying the test pattern to emulate the influence of one or more communications network qualities prior to providing the test input to the voice portal.

13. A system for evaluating grammars of a voice portal executing on a portal server, the system comprising:

an analysis interface to extract a current grammar from a set of active grammars of the voice portal, the current grammar representing a valid input for a first menu of the voice portal and being one grammar of the set of active grammars, the set of active grammars including at least one grammar from a second menu of the voice portal;

a test pattern generator to generate a test input for the current grammar, the test input including a test pattern;

a text-to-speech engine on a computer to enter the test input into the voice portal;

a results collector to analyze the test input entered into the voice portal against the set of active grammars; and a results analyzer to derive a set of statistics indicative of how distinguishable the current grammar is from other grammars of the set of active grammars, the set of statistics being indicative of how distinguishable the current grammar is from the at least one grammar from the second menu of the voice portal, and to determine, based at least in part on the at least one measure, whether to modify the current grammar from the first menu to be distinguishable from the at least one grammar from the second menu.

14. The system of claim 13, wherein the set of statistics includes a confidence level and a set of n-best results for the test input, and wherein the results analyzer is configured to compare the confidence level and set of n-best results for the test input with an expected value to assess how distinguishable the current grammar is from other grammars of the set of active grammars.

15. The system of claim 13, wherein the test pattern generator is configured to modify the test pattern to emulate one or more user voices prior to entering the test input into the voice portal.

16. The system of claim 13, wherein the test pattern generator is configured to modify the test pattern to emulate the influence of one or more communications network qualities prior to entering the test input into the voice portal.

17. The system of claim 13, further comprising at least one processor programmed to act as the analysis interface, the test pattern generator, the text-to-speech engine, and the results analyzer.

* * * * *